United States Patent
Lee et al.

(10) Patent No.: US 8,230,429 B2
(45) Date of Patent: Jul. 24, 2012

(54) DETECTING A DEADLOCK CONDITION BY MONITORING FIRMWARE INACTIVITY DURING THE SYSTEM IPL PROCESS

(75) Inventors: Van Hoa Lee, Cedar Park, TX (US); David Dean Sanner, Rochester, MN (US); Alan Hlava, Mazeppa, MN (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 12/129,893

(22) Filed: May 30, 2008

(65) Prior Publication Data
US 2009/0300644 A1 Dec. 3, 2009

(51) Int. Cl.
*G06F 9/46* (2006.01)
*G06F 9/44* (2006.01)
(52) U.S. Cl. ........................ 718/102; 717/124; 717/127
(58) Field of Classification Search ................ None
See application file for complete search history.

(56) References Cited

U.S. PATENT DOCUMENTS

| 6,587,966 | B1 | 3/1984 | Manizza |
| 6,829,729 | B2 | 2/1986 | Angevine |
| 6,845,469 | B2 | 3/1986 | Tsuruta |
| 7,281,171 | B2 | 12/1988 | Hubbell |
| 5,491,799 | A * | 2/1996 | Kreuzenztein et al. ........ 709/213 |
| 6,550,019 | B1 * | 4/2003 | Ahrens et al. .................... 714/10 |
| 7,213,244 | B2 * | 5/2007 | Chang et al. ................... 717/161 |

\* cited by examiner

*Primary Examiner* — Kenneth Tang
(74) *Attorney, Agent, or Firm* — Yee & Associates, P.C.; David A. Mims, Jr.

(57) ABSTRACT

Illustrative embodiments manage deadlock in a data processing system during an IPL process that includes monitoring the usage of locks in the Hardware Object Model (HOM) of the data processing system. The process further includes detecting a deadlock condition in response to an indication of the IPL process in the data processing system entering a hung state when at least one lock is in use. The process also includes handling the deadlock condition by performing one or more of the following: recording error information for the deadlock condition, and terminating the IPL process.

20 Claims, 5 Drawing Sheets

DETECTING A DEADLOCK CONDITION BY MONITORING FIRMWARE INACTIVITY DURING THE SYSTEM IPL PROCESS

FIELD OF THE INVENTION

The present invention generally relates to data processing systems and more specifically to deadlock management in the data processing systems.

BACKGROUND OF THE INVENTION

Hardware Object Model (HOM) provides an object-oriented representation of components of a data processing system. The object-oriented model abstracts various hardware components of the data processing system as software HOM objects. These software HOM objects manage states (like WAIT, HUNG, etc.) of the corresponding hardware components, and provide ways to access and control the hardware components for their initialization (bootstrapping) and normal operation.

The HOM firmware component implements HOM locks for hardware access protection and software data protection. Under multiple-thread execution environment, each software HOM object has a corresponding HOM-lock to ensure that only one thread controls the hardware corresponding to the object at any given time. However, there may be a situation when two or more threads/processes compete for a common object, access to which has been locked by a firmware performing, an Initial Program Load (IPL) process. In such a case, the firmware execution is stalled, thereby halting the IPL process since neither of the two processes is able to complete its task, as the common object is unavailable. This situation may be due to a firmware bug, thus resulting in a deadlock condition.

This deadlock condition becomes even more critical as it happens during the IPL process, and hence prevents the data processing system from booting itself. This also prevents programmers from obtaining valuable memory dumps that are generally used to record the events that led to the deadlock condition.

Therefore, there is a need in the art for a process, apparatus and program product to manage the deadlock condition.

BRIEF SUMMARY OF THE INVENTION

A computer implemented process for managing a deadlock condition in a data processing system during an IPL process is provided. The process includes monitoring the usage of locks in the Hardware Object Model (HOM) of the data processing system. The process further includes detecting a deadlock condition in response to an indication of the IPL process in the data processing system entering a hung state when at least one lock is in use. The process further includes handling the deadlock condition by performing one or more of the following: recording error information for the deadlock condition, and terminating the IPL process.

A programmable apparatus for to manage deadlock condition in a data processing system during an IPL process. The apparatus includes programmable hardware connected to a memory. The apparatus further includes a program stored in the memory and the program directs the programmable hardware to perform monitoring the usage of locks in the Hardware Object Model (HOM) of the data processing system. The program directs the programmable hardware to also perform detecting a deadlock condition in response to an indication of the IPL process in the data processing system entering a hung state when at least one lock is in use. The program further directs the programmable hardware to also perform handling the deadlock condition by performing one or more of the following: recording error information for the deadlock condition, and terminating the IPL process.

A computer program product for causing a computer to manage deadlock condition in a data processing system during an IPL process. The computer program product includes a computer readable storage medium. The computer program product further includes a program stored in the computer readable storage medium. The computer readable storage medium, so configured by the program, causes a computer to perform monitoring the usage of locks in the Hardware Object Model (HOM) of the data processing system. The computer is further configured to perform detecting a deadlock condition in response to an indication of the IPL process in the data processing system entering a hung state when at least one lock is in use. The computer is further configured to perform handling the deadlock condition by performing one or more of the following: recording error information for the deadlock condition, and terminating the IPL process.

BRIEF DESCRIPTION OF VARIOUS EMBODIMENTS OF THE DRAWINGS

DETAILED DESCRIPTION

The present invention would now be explained with reference to the accompanying figures. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Figure 1:
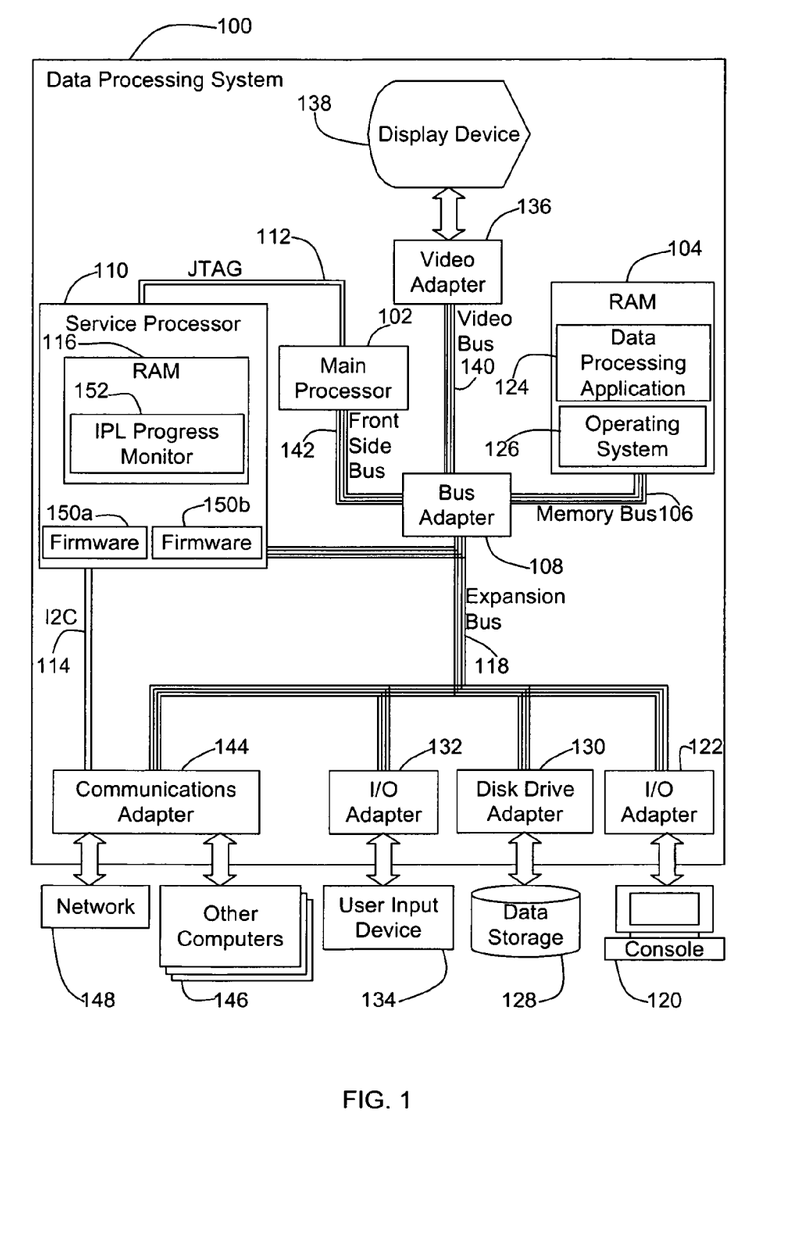
FIG. 1 sets forth a block diagram of automated computing machinery comprising an exemplary data processing system in accordance with an embodiment of the invention.

FIG. 1 sets forth a block diagram of automated computing machinery comprising an exemplary data processing system 100. Data processing system 100 of the FIG. 1 includes at least one processor 102 or 'CPU' of the main data processing system 100 and a random access memory 104 ('RAM'), which is connected through a high speed memory bus 106 and bus adapter 108 to processor 102 and to other components of data processing system 100. Data processing system 100 of the FIG. 1 further includes at least one service processor 110, which is also connected through bus adapter 108 to processor 102 and to other components of data processing system 100. In this example, service processor 110 is also connected to other components of data processing system 100 through a Joint Test Action Group ('JTAG') connection 112 and an inter-integrated circuit ('I2C') connection 114. Processor 102 is herein after referred to as a 'main processor 102' to distinguish it from service processor 110. Main processor 110 is the processor upon which normal data processing programs such as but not limited to, server applications, word processing programs, web sites, spreadsheets, database managers, and so on, are executed. Service processor 110 is a computer-within-a-computer; and data processing system 100 (that includes service processor 110) is hereinafter interchangeably referred to as a 'host data processing system'. Hence, in this example of the FIG. 1, host data processing system 100 has main processor 102, RAM 104 (i.e. main memory), bus adapter 108, expansion bus 118, and so on.

Service processor 110 operates independently of main processor 102 and includes independent RAM 104 and other components explained in detail below. The term 'service processor' refers both to the service processor hardware, one or more microprocessors, RAM, flash memory, and so on, as well as the software and firmware of the service processor. The service processor operates generally to provide to host data processing system services like, but not limited to, diagnostics, initialization services, configuration services, run-time error detection, and error correction. Service processor 110 controls the hardware of host data processing system 100, provides 110 functionality for management control through a management console 120 and monitors/diagnoses the operational state, and so on. Examples of services provided by service processor 110 for host data processing system 100 typically include 'Power On Self Test' and other similar host diagnostics, environmental monitoring and automated domain-shutdown in the event of out-of-bounds conditions, such as a CPU getting too hot. The services of service processor 110 further includes assigning multiple paths to I/O devices for increased availability, monitoring and displaying host environmental statistics, such as the temperatures, currents, and voltages present on system boards. Service processor 110 also provides the functionality of monitoring and controlling power flow to the host components such as system boards and control boards, and logging, notification, and response for various events in the host computer.

Service processor 110 is connected through expansion bus 118 and I/O 122 adapter to management console 120. Management console 120 is operated by an operator as a specific terminal for issuing commands to service processor 110 and for viewing status reports and event notifications from service processor 110. Of course, service processor 110 also may send status reports and event notifications to printers, disk files, or other I/O destinations.

RAM 104 of host data processing system 100 stores a data processing application 124, which is a module of computer program instructions for carrying out user-level data processing. Examples of data processing applications include server applications, word processing programs, web sites, spreadsheets, database managers, and so on. RAM 104 also stores an operating system 126. However, data processing application 124 and operating system 126 are shown in RAM 104, but many components of such software typically are stored in non-volatile memory also, such as, for example, in Flash memory or on a disk drive 128.

Data processing system 100 of the FIG. 1 further includes disk drive adapter 130 that is coupled through expansion bus 118 and bus adapter 108 to processor 102 and other components of data processing system 100. Disk drive adapter 130 connects non-volatile data storage to the data processing system 100 in the form of disk drive 128. Disk drive adapters useful in computers include Integrated Drive Electronics ('IDE') adapters, Small Computer System Interface ('SCSI') adapters, and others as will be apparent to those of skill in the art. Non-volatile computer memory also may be implemented as an optical disk drive, electrically erasable programmable read-only memory (so-called 'EEPROM' or 'Flash' memory), RAM drives, and so on, as will be apparent to those of skill in the art.

Data processing system 100 of the FIG. 1 includes one or more input/output ('I/O') adapters 132. I/O adapters implement user-oriented input/output through, for example, software drivers and computer hardware for controlling output to display devices such as computer display screens, as well as user input from user input devices 134 such as keyboards and mice. Data processing system 100 further includes a video adapter 136, which is an example of an I/O adapter specially designed for graphic output to a display device 138 such as a display screen or computer monitor. Video adapter 136 is connected to processor 102 through a high speed video bus 140, bus adapter 108, and the front side bus 142, which is also a high speed bus.

Data processing system 100 of the FIG. 1 also includes a communications adapter 144 for data communications with other computers 146 and for data communications with a data communications network 148. Such data communications may be carried out serially through RS-232 connections, or external buses such as a Universal Serial Bus ('USB'), or data communications networks such as IP data communications networks, and using other communication means as will be apparent to those of skill in the art. Communications adapters implement the hardware level of data communications through which one computer sends data to another computer, directly or through a data communications network. Examples of communications adapters useful in computers that support using an event manager to effect a library function call according to various embodiments of the present invention, include modems for wired dial-up communications, Ethernet (IEEE 802.3) adapters for wired data communications network communications, and 802.11 adapters for wireless data communications network communications.

Also, service processor 110 contained in the data processing system 100 of the FIG. 1 further includes one or more firmware 150*a* and 150*b*, to provide expanded functionality. Firmwares 150*a-b* can be defined as computer programs embedded in hardware devices. Examples of firmwares 150*a-b* can be a microcontroller, or microchip with embedded software. In an embodiment of the present invention, firmwares 150*a-b* can also be provided on flash ROMs or as a binary image file, which can be uploaded onto existing hardware components of data processing system 100.

In an embodiment of the present invention, an object-oriented model, such as a Hardware Object Model (HOM) provides an object-oriented representation of all hardware components of data processing system 100. HOM is a code component of the service processor 110. HOM provides addressability to the individual hardware components of data processing system 100 and keeps track of the internal states of hardware components by abstracting various hardware components of data processing system 100 as software HOM objects so that the hardware component has information of only its interfaces with other components. These objects may be accessed during an IPL process (a process that boots or reboots a server or a computer machine).

The HOM of data processing system 100 implements HOM-lock objects, hereinafter interchangeably referred to as HOM-locks or locks, for access protection of various hardware components of data processing system 100 and even software data protection. In other words, HOM-locks are introduced to make sure the HOM objects are multi-threading safe. To speed up the time to complete the IPL of a server (which may include data processing system 100), service processor 110 implemented in the data processing system 100 supports the multi-threading environment. Generally an IPL progress monitor 152 is provided in service processor 110 to monitor progress heartbeats of different processes that run during the IPL process in a multi-threading environment. In such an implementation, every component/process needs to take a lock for component/resource for the duration the component/process desires exclusive access to that resource. The HOM-lock ensures that only a single thread from multiprocessors (multi-threading environment) controls the hardware component of data processing system 100 at a time. In an embodiment of the present invention, the HOM-lock objects may be handled by firmware 150a or 150b.

However, there may be a situation when multiple components or processes may wait for each other to release (or unlock) their common resources such as processor. For example, a process A may wait for resources used/locked by process B, and vice-versa, and as a result both processes continue waiting indefinitely, thus creating a deadlock. In other words, deadlock conditions might occur if any code violates the lock usage convention. The deadlock condition during the IPL process becomes more critical as it prevents data processing system 100 from booting itself.

Figure 2:
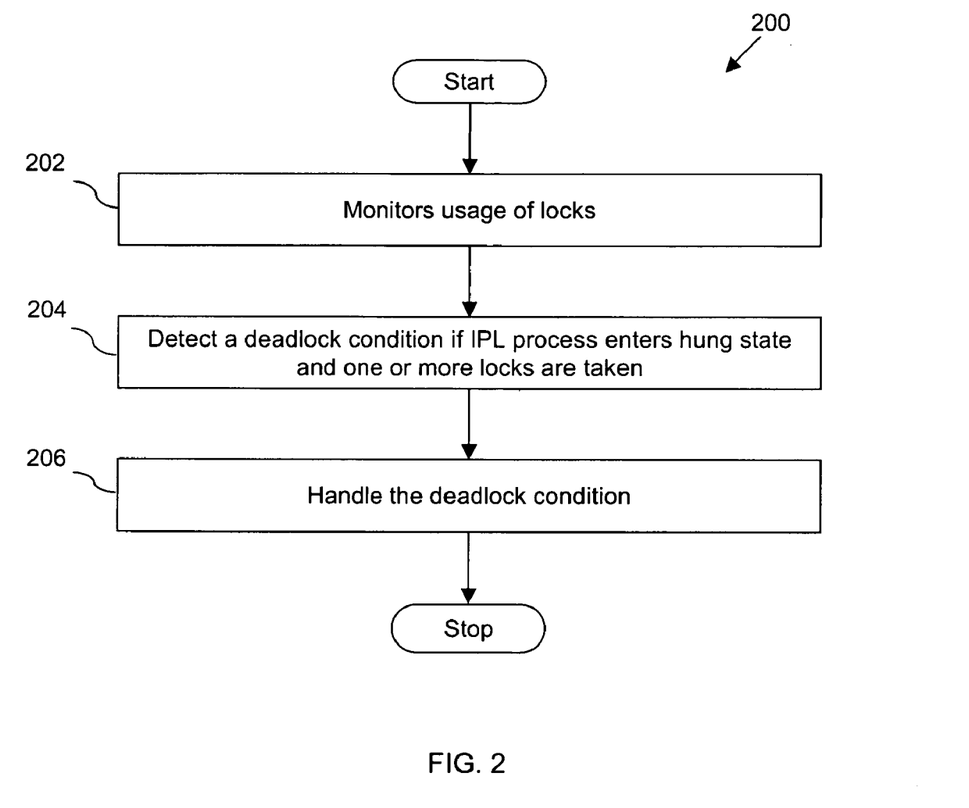
FIG. 2 depicts a flowchart for managing a deadlock condition in a data processing system during an Initial Program Load (IPL) process in accordance with an embodiment of the invention.

FIG. 2 depicts a process (200) for managing a deadlock condition in data processing system 100 during an IPL process, in accordance with an embodiment of the invention. At step (202), process 200 monitors the usage of locks in the HOM of data processing system 100. In other words, the usage of locks for HOM objects is monitored. In an embodiment of the present invention, process 200 starts the monitoring of the usage of locks when the IPL process initializes. Further, process 200 maintains a list for tracking usage of locks, i.e., addition and removal of locks. In an embodiment of the present invention, the usage list is a linked list of the addresses of the lock objects in use. These addresses allow debugging tools to get access to the lock objects to collect additional information. Process 200 also maintains a counter for counting the number of locks in the list at a particular time. Now when the IPL process is initiated, the list is empty and the counter is '0', indicating that no locks are in use. However, when a lock is in use during the IPL process, process 200 updates the list by adding the lock in the list and at the same time incrementing the value of the counter by '1'. In an embodiment of the invention, the addition of a lock indicates that the firmware 150a performing the IPL task has locked the access to an object, which may be a hardware or software component. Now since one object is already being accessed, no other firmware (say 150b) should be able to access the same object until the lock is released by the owner firmware 150a. Hence, if the list has at least one lock (and has corresponding counter value is equal to or greater than '1'), then at step (204), process 200 detects a deadlock condition if an indication is received that the IPL process of data processing system 100 has entered a HUNG state. In other words, by the time process 200 receives the indication, data processing system 100 may have already entered the HUNG state and since one or more locks are in use, process 200 treats this HUNG state as deadlock condition. This is a preemptive measure taken to track the deadlock condition and thus catch bug early in development cycle due to deadlock for failure analysis from the field. Since an object is in use and held exclusively by the current owner firmware for a long period of time, if any other firmware attempts to access the same object, it may cause IPL process to go into HUNG state and thus causing a deadlock. The IPL process enters the HUNG state according to a pre-defined criterion. In an embodiment of the present invention, at every 10 seconds interval the processes during the IPL process posts progress heartbeat. In case when even during 15 consecutive checks (i.e. for a time period of 150 seconds), no heartbeats are posted from the processes running during the IPL process, then the IPL process may be considered to have entered the HUNG state. It will be apparent to a person skilled in the art that different data processing systems may have their own criterion for defining HUNG state. However in an embodiment of the present invention, if the lock is released, then the lock is removed from the list and the counter is decremented by '1'. Now if the value of the counter is '0', then process 200 does not detect any deadlock condition even if the indication that is received indicates that the IPL process has entered the HUNG state.

FIG. 2 further depicts an embodiment of the present invention, where at step (206), process 200 handles the deadlock condition. In an embodiment of the present invention, process 200 handles the deadlock condition by recording error information of the deadlock condition. For example, process 200 captures the list for number of locks in use at the time of deadlock, the firmware (say firmware 150a) owner of the lock, the timestamp at which the lock was taken, the name of the function from where a call to take the lock was made, etc. By obtaining the list of the lock objects in use, the debugging information will be collected. In another embodiment of the invention, process 200 sends a signal that terminates the IPL process with a core dump.

In an embodiment of the present invention, IPL progress monitor 152 performs process 200 as explained in FIG. 2. IPL progress monitor 152 is a sub process of the IPL process. In another embodiment of the present invention, two separate monitors perform process 200, where IPL progress monitor 152 may handle the progress of IPL process while the second monitor may track usage of HOM locks. The second monitor may also be a sub process of the IPL progress monitor.

Figure 3:
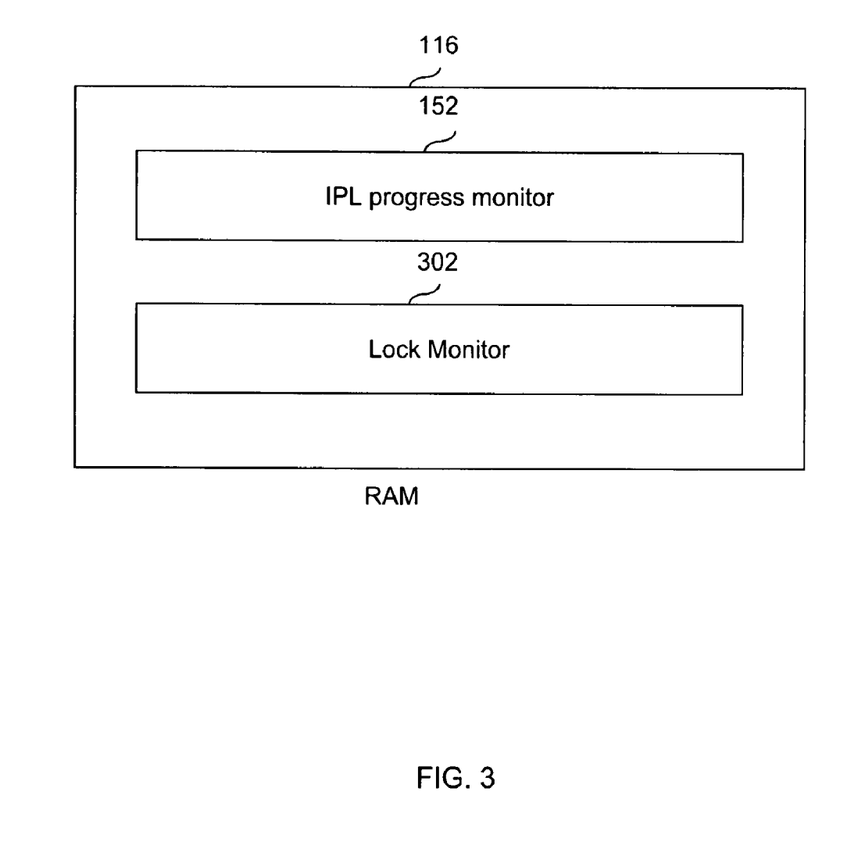
FIG. 3 depicts a main memory of the data processing system in accordance with an embodiment of the invention.

FIG. 3 depicts RAM 104 of data processing system 100 in accordance with an embodiment of the present invention. RAM 104 includes IPL progress monitor 152 and a lock monitor 302 (i.e., the second monitor). IPL progress monitor 152 watches the progress heartbeats posted by different processes running during the IPL process. IPL progress monitor 152 sends a notification to lock monitor 302 to start monitoring the usage of locks. Lock monitor 302 maintains a list that tracks usage of locks by either adding or removing the locks from the list. Lock monitor 302 also maintains a counter that counts the number of locks in a list. In an embodiment of the present invention, when the IPL process is running, lock monitor 302 may notify IPL progress monitor 152 to treat HUNG state as a deadlock if the internal boolean flag of lock monitor 302 is true and the counter value is more than zero. When IPL progress monitor 12 detects deadlock then lock monitor 302 sends a signal to terminate the IPL process. Upon receiving the terminating signal, the IPL process terminates itself with an application core dump of the IPL process.

In an embodiment of the present invention, RAM 104 stores program instructions that perform one or more process steps as explained in conjunction with the FIG. 2. To perform steps (202) and (206), the program instructions are stored in lock monitor 302, whereas to perform step (204) the program instructions are stored in IPL progress monitor 152. Further, a programmable hardware executes these program instructions. The programmable hardware may include, without limitation hardware that executes software based program instructions. The programmable hardware may also include hardware where program instructions are embodied in the hardware itself such as Field Programmable Gate Array (FPGA), Application Specific Integrated Circuit (ASIC) or any combination thereof.

Figure 4:
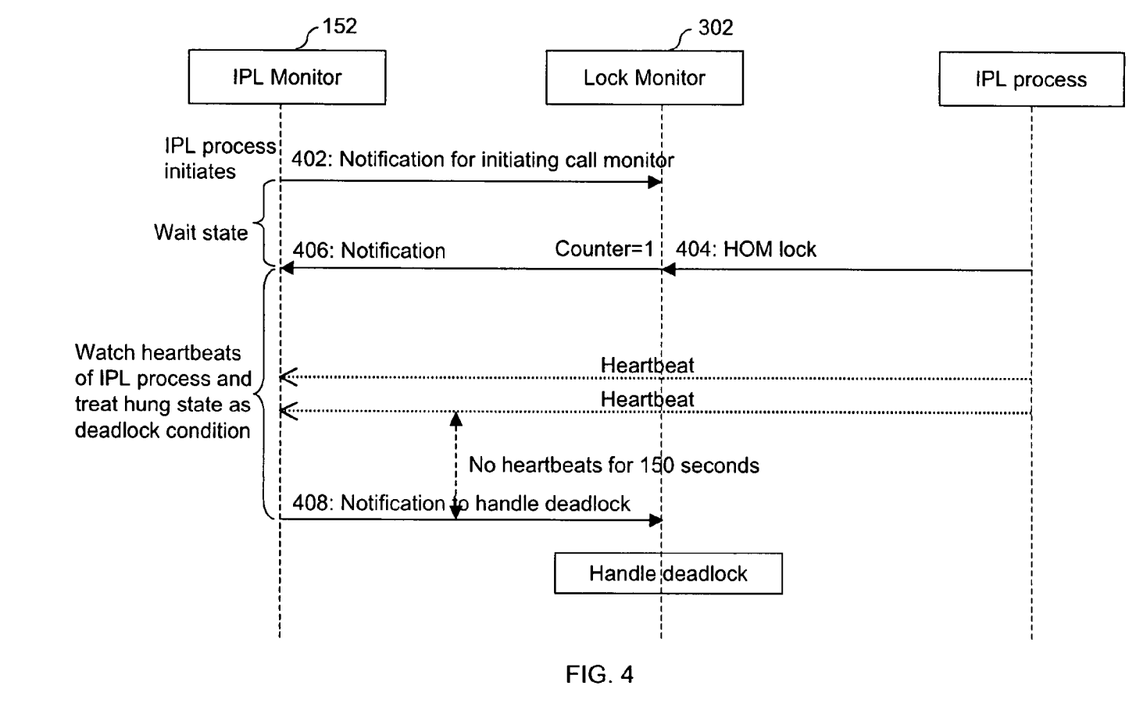
FIG. 4 depicts a process flow for managing a deadlock condition in the data processing system during the IPL process in accordance with a first embodiment of the invention.

FIG. 4 depicts a process flow for managing a deadlock condition in data processing system 100 during the IPL process in accordance with a first embodiment of the invention. When the IPL process of data processing system 100 initiates, lock monitor 302 and IPL progress monitor 152 are initiated. At step (402), IPL progress monitor 152 sends a notification to lock monitor 302 by calling an interface function provided by the lock monitor 302. The interface function then sets lock monitor's 302 internal boolean flag iv_enableDeadLockMonitor to TRUE. After sending the notification, IPL progress monitor 152 stays in WAITING state. In other words, IPL progress monitors 152 waits for a notification from lock monitor 302 to start monitoring the progress of the IPL process again. Upon receiving the notification from the IPL progress monitor 152, lock monitor 302 starts monitoring the usage of locks in data processing system 100. In an embodiment of the present invention, lock monitor 302 maintains a list in a database for adding and removing locks. Also, lock monitor 302 maintains a counter that counts the number of locks in the list at a particular time. Now, when the IPL process is initiated, the list is empty and the counter is '0', indicating that no locks are in use. Thereafter, at step (404), firmware 150a performing the IPL task locks the access to an object of data processing system 100. Now since one object is already in use, no other firmware (say firmware 150b) should be able to access the same object. Lock monitor 302 then updates the database list by adding the lock in the list and at the same time incrementing the value of the counter by '1'. Now, since one lock is added in the list (and the corresponding counter values is '1') and the internal boolean flag is set to TRUE, at step (406), lock monitor 302 sends a notification to IPL progress monitor 152 to start watching the progress heartbeats posted by the processes running during the IPL process and treat the hung state of the IPL process as a deadlock condition. In an embodiment of the present invention, when IPL progress monitor 152 does not receive any progress heartbeats for a pre-defined time period, the IPL monitor enters the HUNG state, which serves as an indication that the IPL process has entered in a HUNG state. In an embodiment of the present invention, the IPL progress monitor 152 constantly checks for heartbeats from processes that are running during the IPL process. At every 10 seconds interval, IPL progress monitor 152 checks for any posted heartbeats by making sure that IPL progress monitor 152 is in PROGRESSING state. Thereafter, IPL progress monitor 152 changes its state to NOT PROGRESSING state until it waits for the next progress heartbeat to arrive. However, if for 150 seconds, (i.e. even after 15 consecutive checks), IPL progress monitor 152 does not receive a heartbeat, then IPL progress monitor 152 enters the HUNG state. This state of IPL progress monitor 152 indicates that the IPL process may have entered the HUNG state anytime during the 150 seconds interval.

Once the deadlock is detected, thereafter at step (408), IPL progress monitor 152 sends a notification to lock monitor 302 to handle the deadlock condition. Upon receiving the notification from IPL progress monitor 152, lock monitor 302 handles the deadlock condition. In an embodiment of the present invention, lock monitor 302 handles the deadlock condition by recording error information of the deadlock and recording data processing system's 100 condition at the time of deadlock. For example, lock monitor 302 captures the list of locks in use at the time of deadlock, the firmware owner of the lock, the time stamp at which the lock was taken etc. for debugging purposes. In another embodiment of the invention, lock monitor 302 sends a signal to the IPL process and the IPL process terminates itself with an application core dump of the IPL process.

Figure 5:
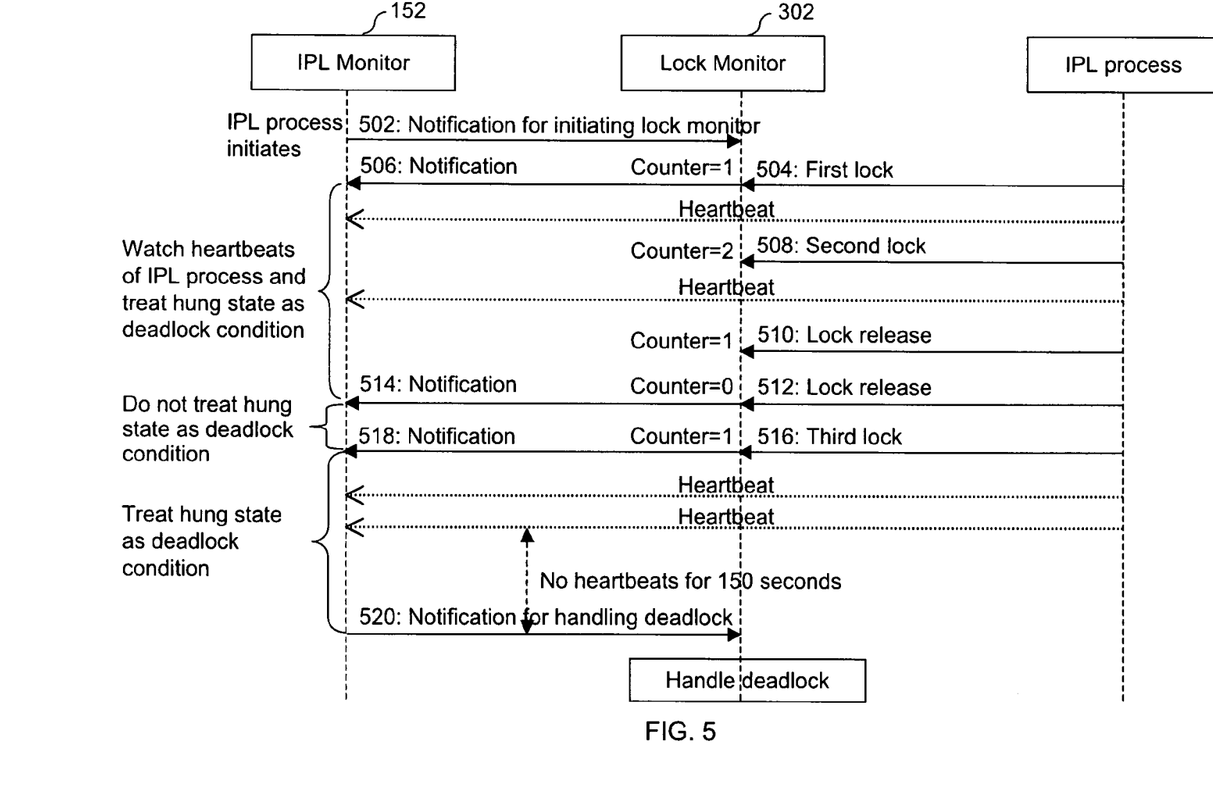
FIG. 5 depicts a process flow for managing a deadlock condition in the data processing system during the IPL process in accordance with a second embodiment of the invention.

FIG. 5 depicts a process flow for managing a deadlock condition in data processing system 100 during the IPL process in accordance with another embodiment of the invention. Steps (502), (504) and (506) of FIG. 5 are similar to steps (402), (404) and (406) of the FIG. 4. In other words, IPL progress monitor 152 starts monitoring the progress heartbeats posted by the processes that are running during the IPL process when lock monitor 302 notifies that first lock has been taken by firmware 150a (thus incrementing counter to '1') and specifies IPL progress monitor 152 to treat the HUNG state as deadlock condition. Thereafter, at step (508) second lock is taken by firmware 150b. Subsequently, lock monitor 302 updates the list by adding the lock in the list and increasing the counter to '2'. It is apparent to a person skilled in the art that the number of locks taken depends on the number of objects in data processing system 100, and these two locks are shown only for explanation purposes.

In one embodiment of the present invention, at step (510), one of the first or second lock is released and simultaneously, lock monitor 302 removes the lock from the list and decrements the value of the counter by 1 to make it '1'. Similarly, when the other lock is released, as shown in step (512), lock monitor 302 updates the value of counter to '0'. Thereafter, at step (514) lock monitor 302 sends a notification to IPL progress monitor 152 indicating not to treat the hung state as the deadlock condition as no object is locked during the IPL process and hence deadlock may not occur.

FIG. 5 further depicts an embodiment of the present invention, when a third lock is taken at step (516), lock monitor 302 updates the list and increases the value of the counter from '0' to '1'. Since the internal boolean flag iv_enableDeadLockMonitor is set to TRUE and the value of the counter is '1', lock monitor 302 again sends a notification to IPL progress monitor 152 at step (518) indicating to treat the hung state as deadlock. However, in this case, lock monitor 302 does not notify the IPL progress monitor 152 to monitor progress heartbeats as IPL progress monitor 152 is already monitoring these heartbeats, at an interval of 10 seconds, since it received first notification at step (506). Now if IPL progress monitor 152 does not receive the progress heartbeats (shown by dotted lines in the FIG. 5) for 15 consecutive checks, then at step (520) IPL progress monitor 152 sends a notification to lock monitor 302 indicating to handle deadlock condition. Thereafter, lock monitor 302 handles the deadlock condition in a similar manner as explained in conjunction with the FIG. 4.

In an embodiment of the present invention, RAM 104 (as shown in FIGS. 1 and 3) stores program instructions that perform one or more process steps as explained in conjunction with the FIG. 4 and FIG. 5.

Various embodiments of the present invention use IPL progress monitor and lock monitor to detect and handle a deadlock condition during the IPL process. Handling of deadlock condition allows system programmers to get valuable memory dump which is generally used for debugging the system to avoid any future deadlocks.

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W), DVD and blu-ray.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A computer implemented process for managing a deadlock condition in a data processing system during an Initial Program Load (IPL) process, the computer implemented process comprising:
   using a computer performing the following series of steps:
      monitoring the usage of locks in the Hardware Object Model (HOM) of the data processing system;
      detecting a deadlock condition in response to an indication of the IPL process in the data processing system entering a hung state where no progress in the IPL process occurs according to a pre-defined criterion and when at least one lock is in use; and
      handling the deadlock condition, wherein the handling comprises one or more of the following:
         recording error information for the deadlock condition including capturing a list of the addresses of lock objects in use at the time of deadlock for debugging purposes; and
         terminating the IPL process.

2. The computer implemented process of claim 1, wherein monitoring the usage of locks is initiated upon receiving a notification for an initialization of the IPL process.

3. The computer implemented process of claim 1, wherein the response to an indication of the IPL process entering the hung state is received if progress heartbeat of the IPL process is not received for a pre-defined time period.

4. The computer implemented process of claim 1, wherein monitoring the usage of the locks further comprising:
   updating the list by adding locks in the list if the locks are in use;
   modifying the list by removing the locks from the list if the locks are released; and
   updating a value of a counter depending on whether the locks added or removed from the list.

5. The computer implemented process of claim 4 further comprises:
   sending a notification to treat a hung state in the IPL process as the deadlock condition if the value of the counter is greater than or equal to one; and
   sending a notification to not treat the hung state in the IPL process as the deadlock condition if the value of the counter is zero.

6. The computer implemented process of claim 1, wherein recording error information comprises capturing the error information at the time of the deadlock.

7. The computer implemented process of claim 6, wherein the error information comprises one or more of the following:
   usage of locks at the time of the deadlock;
   firmware owner of the lock; and
   timestamp at which the lock is taken.

8. A programmable apparatus for managing a deadlock condition in a data processing system during an IPL process, comprising:
   a programmable hardware connected to a memory;
   a program stored in the memory, wherein the memory comprises:
      IPL progress monitor; and
      lock monitor;
      wherein the program directs the programmable hardware to perform the following series of steps:
         monitoring the usage of locks in the Hardware Object Model (HOM) of the data processing system;
         detecting a deadlock condition in response to an indication of the IPL process in the data processing system entering a hung state where no progress in the IPL process occurs according to a pre-defined criterion and when at least one lock is in use; and
         handling the deadlock condition, wherein the handling comprises one or more of the following:
            recording error information for the deadlock condition including capturing a list of the addresses of lock objects in use at the time of deadlock for debugging purposes; and
            terminating the IPL process.

9. The programmable apparatus of claim 8, wherein the IPL progress monitor watches the progress heartbeats of the IPL process.

10. The programmable apparatus of claim 8, wherein the IPL progress monitor enters a hung state to provide an indication for the IPL process in the data processing system entering a hung state.

11. The programmable apparatus of claim 10, wherein the IPL progress monitor enters in the hung state if the progress heartbeat of the IPL process is not received for a pre-defined time period.

12. The programmable apparatus of claim 8, wherein the lock monitor maintains one or more of following:
   the list for adding or removing locks; and
   a value of a counter corresponding to the number of locks in the list.

13. The programmable apparatus of claim 8, wherein the lock monitor:
   sending a notification to treat a hung state as the deadlock condition if the value of the counter is greater than or equal to one; and
   sending a notification to not treat the hung state as the deadlock condition if the value of the counter is zero.

14. A computer program product on a computer readable storage medium for causing a computer to manage deadlock condition in a data processing system during an IPL process, comprising:
- a computer readable storage medium;
- a program stored in the computer readable storage medium;
- wherein the computer readable storage medium, so configured by the program, causes a computer to perform:
  - monitoring the usage of locks in the Hardware Object Model (HOM) of the data processing system;
  - detecting a deadlock condition in response to an indication of the IPL process in the data processing system entering a hung state where no progress in the IPL process occurs according to a pre-defined criterion and when at least one lock is in use; and
  - handling the deadlock condition, wherein the handling comprises one or more of the following:
    - recording error information for the deadlock condition including capturing a list of the addresses of lock objects in use at the time of deadlock for debugging purposes; and
    - terminating the IPL process.

15. The computer program product on a computer readable storage medium of claim 14, wherein monitoring the usage of locks is initiated upon receiving a notification for an initialization of the IPL process.

16. The computer program product on a computer readable storage medium of claim 14, wherein the response to an indication of the IPL process entering the hung state is received if progress heartbeat of the IPL process is not received for a pre-defined time period.

17. The computer program product on a computer readable storage medium of claim 14, wherein monitoring the usage of the locks further comprising:
- updating the list by adding locks in the list if the locks are in use;
- modifying the list by removing the locks from the list if the locks are released; and
- updating a value of a counter depending on whether the locks added or removed from the list.

18. The computer program product on a computer readable storage medium of claim 14 further comprises:
- sending a notification to treat a hung state in the IPL process as the deadlock condition if the value of the counter is greater than or equal to one; and
- sending a notification to not treat the hung state in the IPL process as the deadlock condition if the value of the counter is zero.

19. The computer program product on a computer readable storage medium of claim 14, wherein recording error information comprises capturing the error information at the time of the deadlock.

20. The computer program product on a computer readable storage medium of claim 14, wherein the error information comprises one or more of the following:
- usage of locks at the time of the deadlock;
- firmware owner of the lock; and
- timestamp at which the lock is taken.

* * * * *